Sept. 23, 1930.   F. E. BRESIEN   1,776,412
BEARING
Filed Dec. 17, 1928   3 Sheets-Sheet 1
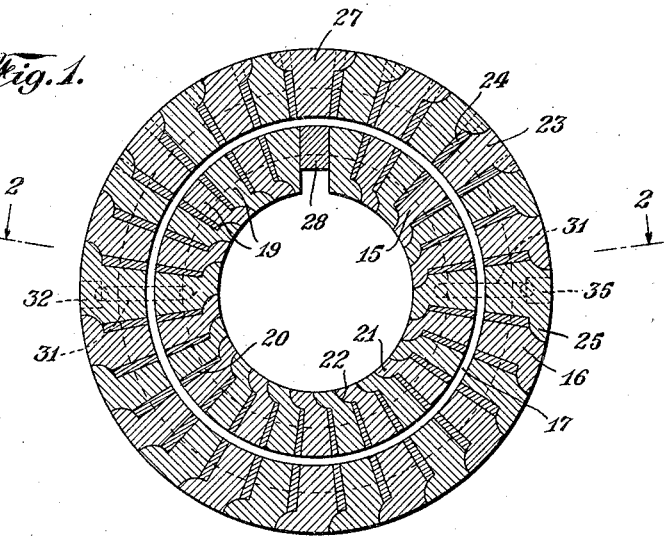
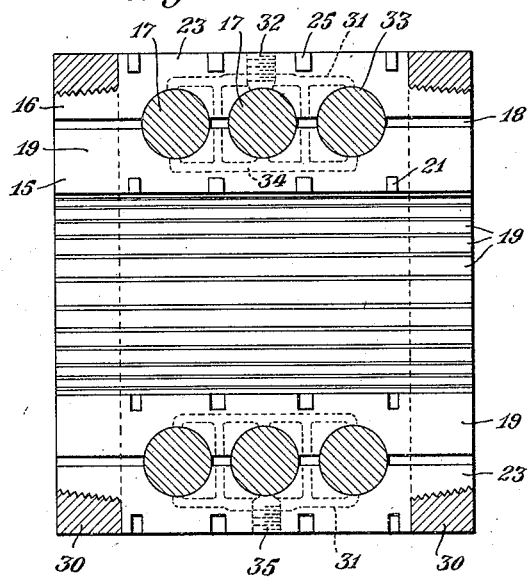
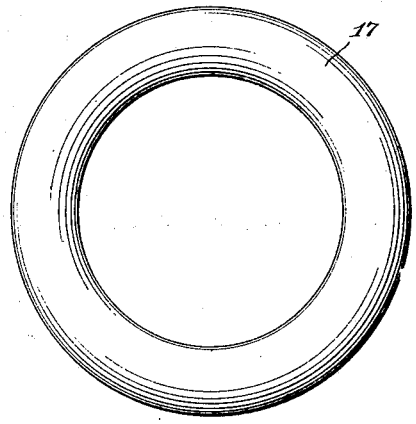
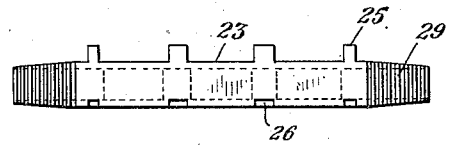
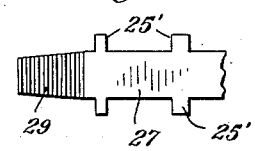
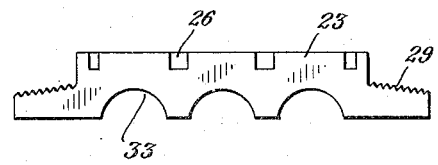
INVENTOR
*Fritz E. Bresien*
BY *Peter M. Boesen*
ATTORNEY Sept. 23, 1930.  F. E. BRESIEN  1,776,412
BEARING
Filed Dec. 17, 1928   3 Sheets-Sheet 2
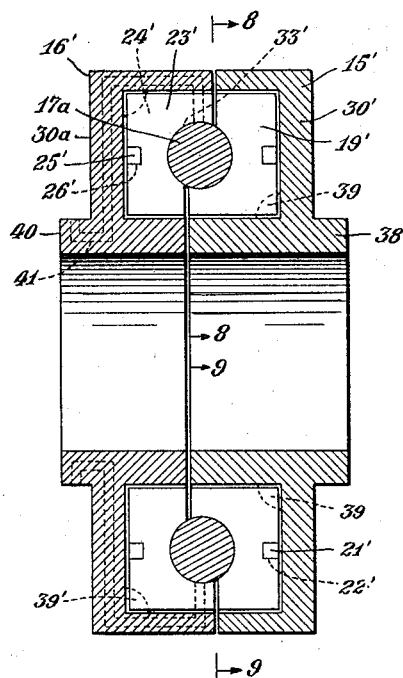
Fig. 7.
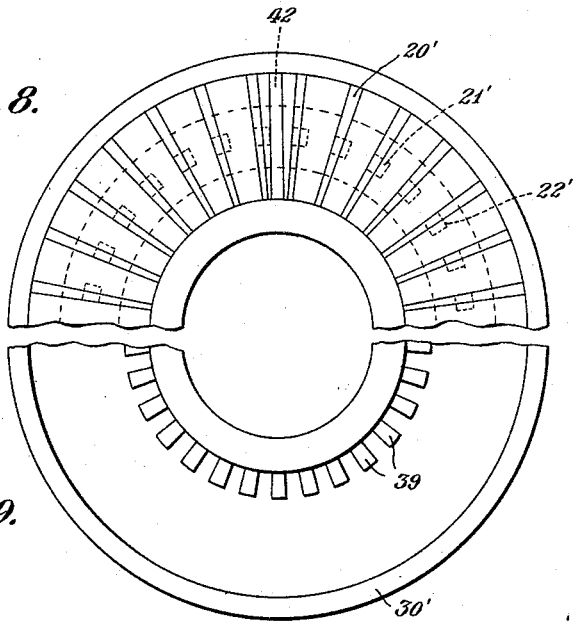
Fig. 8.
Fig. 9.
INVENTOR
Fritz E. Bresien
BY *Peter M. Boesen*
ATTORNEY Sept. 23, 1930.   F. E. BRESIEN   1,776,412
BEARING
Filed Dec. 17, 1928   3 Sheets-Sheet 3
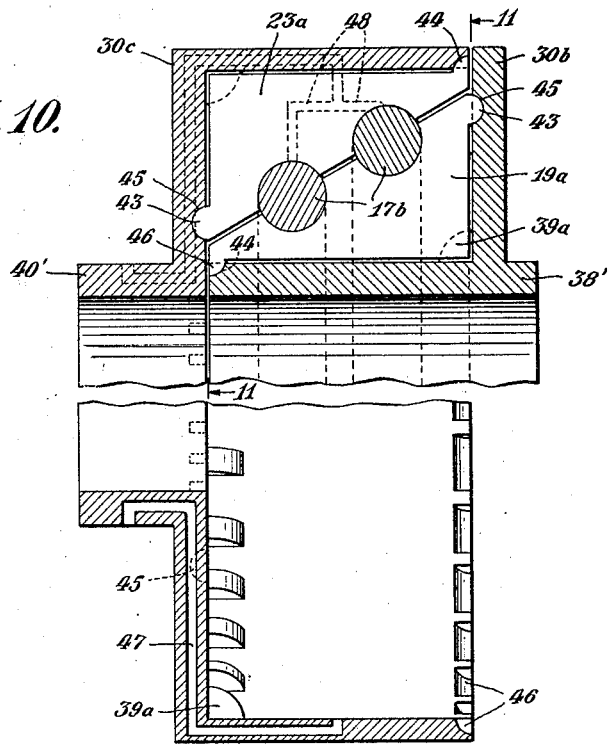
Fig. 10.
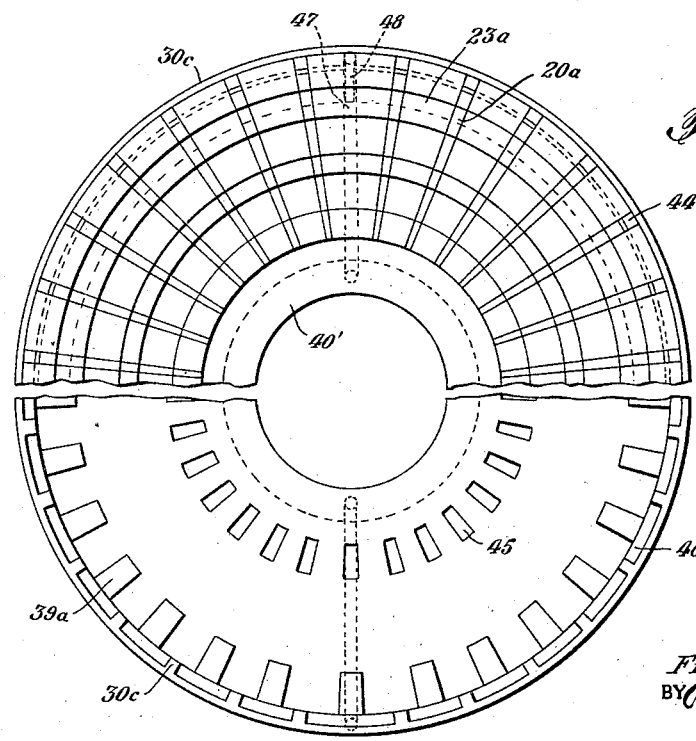
Fig. 11.
Fig. 12.
INVENTOR
Fritz E. Bresien
BY
ATTORNEY Patented Sept. 23, 1930

1,776,412

UNITED STATES PATENT OFFICE

FRITZ E. BRESIEN, OF JERSEY CITY, NEW JERSEY

BEARING

Application filed December 17, 1928. Serial No. 326,607.

This invention relates generally to bearings and has more particular reference to a novel laminated, ring anti-friction bearing.

The invention has for an object the provision of a device of the class mentioned, which is of simple durable construction, desirable in use and efficient in action and which can be manufactured and sold at a reasonable cost.

The invention proposes the use of two laminated race members and a load carrying ring element or a plurality of load carrying ring elements embedded in and moving in raceways formed in the race members. Each of the race members include alternate laminations and separators arranged as hereinafter described. The load carrying element or elements may be made of finely ground, tempered and polished steel alloy, the laminations of bronze and the separators of a composition consisting of: Hair felt—graphite—(tallow + NH$^4$OH), soap. This composition is pressed into the proper shapes under high pressure. A means is provided for properly holding each race member as a single unit and oil passages are formed in the race members for providing proper lubrication and cooling.

Various different kinds of bearings may be constructed according to this invention, such as a radial load bearing, a 60° end thrust load bearing, or a 30° conical thrust load bearing, etc. In each case alternate laminations and separators are used held in proper relation by a load carrying ring or rings and a holding means. The bearings may be constructed for containing one load carrying ring or any number of load carrying rings as desired.

Bearings constructed according to this arrangement are far superior to those used at the present time. The lamination construction produces a bearing of a very strong nature which acting together with the load carrying rings has very efficient operating qualities. Besides the bearing is very simple to assemble and in assembled condition acts as a whole complete unit.

For further comprehension of the invention and of the objects and advantages thereof, reference will be had to the following description and accompanying drawing and to the appended claims in which the various novel features of the invention are more particularly set forth.

In the accompanying drawing forming a material part of this disclosure:

Figure 1 is a transverse vertical sectional view of a device constructed according to this invention.

Fig. 2 is a longitudinal sectional view, taken on the line 2—2 of Fig. 1.

Fig. 3 is a side elevational view of one of the load carrying rings used in the device.

Fig. 4 is a plan view of one of the laminations.

Fig. 5 is an end view thereof.

Fig. 6 is a fragmentary view similar to Fig. 4, but disclosing a master lamination of the device.

Fig. 7 is a view similar to Fig. 2, but illustrating a different form of the invention.

Fig. 8 is a fragmentary elevational view looking in the direction of the line 8—8 of Fig. 7.

Fig. 9 is a fragmentary elevational view looking in the direction of the line 9—9 of Fig. 7, the laminations and separators being removed.

Fig. 10 is another view similar to Fig. 2, but disclosing a further modified form of the device, a portion thereof being broken away.

Fig. 11 is a fragmentary elevational view looking in the direction of the arrows 11—11 of Fig. 10, and Fig. 12 is a fragmentary elevational view looking in the direction of the arrows 12—12 of Fig. 10.

The reference numeral 15 indicates generally a laminated race member and numeral 16 a second laminated race member. These laminated race members are held in spaced relations by load carrying rings 17 so as to produce a clearing space 18.

The laminated race member 15 consists of a plurality of laminations 19 and alternate separators 20. Each of the laminations are provided with projections 21 preferably on their inner ends, which pass thru the separators 20 and engage into grooves 22 formed in an adjacent lamination.

The second laminated race member 16 consists of a plurality of laminations 23 with alternating separators 24 and each of the laminations are provided with projections 25 passing thru the separators and engaging into recesses 26 formed in adjacent laminations. The projections 25 are preferably located on the outer ends of the laminations 23.

One of the laminations of the second laminated race member is known as a master lamination and is indicated by numeral 27. This master lamination differs from the other laminations in that it has projections 25 projecting from opposite sides and engaging in grooves in adjacent laminations. The master lamination itself has no grooves which are engaged by projections from the adjacent laminations. The laminated race member 15 is also provided with a master lamination indicated by numeral 28. This lamination has no projections or grooves and acts against the adjacent laminations for holding them in place. It is pointed out that when the race members are assembled, the master laminations are placed in last for locking all of the laminations into one unit. The outer ends of the laminations 23 are tapered and threaded as indicated by numeral 29 and conical threaded end rings 30 engage upon these threaded ends for holding the bearing in one integral unit.

The load carrying rings 17 are preferably made of circular stock in transverse cross section. Lubrication is provided to these rings by passages 31 in the second laminated race member, provided with an oil entrance passage 32, and the passages 31 also communicate with raceways 33 formed in the race member 16 and the race member 15 for receiving the load carrying rings 17. The race member 15 is also provided with oil passages 34 thru which the oil may circulate and produce cooling effects. Diametrically opposite the oil entrance 32 an oil exit 35 is constructed communicating with the said oil passages 31. Circulation for oil exists from the oil entrance 32 thru the passages 31 and then thru the raceways 33 to the other passages 31, and the oil exit 35. Thus a constant stream of oil may pass thru the bearing for lubricating the oil carrying rings and for cooling purposes. One of the laminations of the race member 15 is worked into a key groove 37 for locking the race member upon a shaft provided with a key.

The bearing is assembled by assembling the inner race member first, that is the alternate laminations and separators inside the load carrying ring elements 17 with said ring elements being brought into position and spaced by placing one of the laminations across the passage of the ring element in such a way that the raceways will engage with the rings, and then alternately adding separators and laminations until the circle is completed by inserting the fastening or locking lamination known as the master lamination provided for that purpose. The outer race member is then assembled around the ring elements in a similar manner and then the conical threaded end rings 30 are engaged in place for completing the bearing. The particular bearing illustrated in Figs. 1 to 6 shows a radial load bearing adapted for carrying ordinary radial loads.

In Figs. 7, 8 and 9 a modified form of the device has been illustrated in which a 60° end thrust load bearing is shown composed of a laminated race member 15' consisting of a holding case 30' formed with a hub portion 38 and with lamination spacing projections 39. Laminations 19' and alternate separators 20' are engaged within the holding casing 30'. The laminations are provided with projections 21' engaging into grooves 22' formed in adjacent laminations.

A second laminated race member 16' coacts with the race member 15' and consists of a holding casing 30$^a$ provided with a hub portion 40 and lamination spacing projections 39'. Alternate laminations 23' and separators 24' are engaged within the holding casing 30$^a$. These laminations are provided with projections 25' engaging into recesses 26' formed in adjacent laminations. The casing 30$^a$ is provided with oil passages 41 communicating with raceways 33' formed in the laminations. The laminations are engaged between the lamination spacing projections 39 for holding them in relative positions with relation to the holding casings.

The laminations within the holding casings are so formed that an approximate 60° angle exists between the point of contact on the lower side of the load carrying ring 17$^a$ shown engaged within the bearing and the point of contact of the laminations on the top side of the said ring. Each of the laminated race members are provided with a master lamination indicated generally by reference numeral 42 for locking the laminations in an assembled position. The method of assembling the parts of the bearing for forming the bearing is similar to that described in the previous form of the device.

In the modified form of the device illustrated in Figs. 10, 11, and 12, a 30° conical thrust bearing has been shown constructed similar to the bearing illustrated in Figs. 7, 8 and 9 with the exception that the angle between the laminations with respect to the horizontal is approximately 30°. Two load carrying rings 17$^b$ have been illustrated engaged in raceways formed in the laminations. The laminations are indicated by numerals 19$^a$ and 23$^a$ and are also provided with projections 43 and 44 engaging in recesses 45 and 46 formed in the casings 30$^b$ and 30$^c$ as illustrated in the drawing. Separators 20ª engage between the laminations, and the casings are formed with lamination spacer projections 39ª. The casing 30ᵇ is provided with a hub portion 38′ and the casing 30ᶜ has a hub portion 40′. Oil passages 47 are arranged within the casing 30ᶜ and connected with passages 48 in the laminations which in turn connect with the raceways formed in the laminations in which the load carrying rings engage.

It is pointed out that in all the bearings described the load carrying rings hold the first laminated race member in spaced relation with the second laminated race member for providing a clearance between said race members, and passages for oil are provided for lubricating the load carrying rings and at the same time cooling the bearing. Due to the angular relations at which the laminations of the race members engage against the load carrying rings the bearing may be constructed as a radial bearing or as a thrust bearing.

While I have illustrated and described my invention with some degree of particularity I realize that in practice various alterations therein may be made. I therefore reserve the right and privilege of changing the form of the details of construction or otherwise altering the arrangement of the correlated parts without departing from the scope of the appended claims.

Having thus described my invention, what I claim as new and desire to secure by United States Letters Patent is:—

1. A bearing, comprising two laminated race members, and load carrying solid ring embedded in and moving in raceways formed in the race members.

2. A laminated ring anti-friction bearing, comprising laminated race members, and a load carrying solid ring embedded in and moving in raceways formed in the race members.

3. A laminated ring anti-friction bearing, comprising laminated race members, and a load carrying ring element embedded in and moving in raceways formed in the race members each race member having radially arranged laminations with liners between the latter.

4. A laminated ring anti-friction bearing, comprising laminated race members, and a load carrying solid ring embedded in and moving in raceways formed in the race members said solid ring being ciruclar in transverse cross section.

5. A laminated ring anti-friction bearing, comprising laminated race members, and a load carrying ring element embedded in and moving in raceways formed in the race members each race member having radially arranged laminations with liners between the latter to form grooves for receiving the said ring element.

6. A laminated ring anti-friction bearing, comprising laminated race members, and a load carrying ring element embedded in and moving in raceways formed in the race members each race member having radially arranged laminations with liners between the latter to form grooves for receiving the said ring element, the ring element being arranged for holding the race elements for providing a clearance between the non-bearing surfaces thereof.

7. A laminated ring anti-friction bearing, comprising laminated race members, and a load carrying ring element embedded in and moving in raceways formed in the race member said race members including alternate laminations and separators, the laminations being of metal and the separators of a composition of hairfelt, graphite and (tallow + $NH_4OH$) soap.

8. A laminated ring anti-friction bearing, comprising laminated race members, and a load carrying ring element embedded in and moving in raceways formed in the race members said race members including alternate laminations and separators and the laminations being formed with projections extending thru the separators and engaging in recesses in adjacent laminations for forming a rigid whole of the laminated unit.

9. A laminated ring anti-friction bearing, comprising laminated race members, and a load carrying ring element embedded in and moving in raceways formed in the race members, said race members including alternate laminations and separators and the laminations being formed with projections extending thru the separators and engaging in recesses in adjacent laminations for forming a rigid whole of the laminated unit, one of the laminations of each race member being formed into a master lamination arranged for being engaged in the unit last and then locking the unit into the said rigid whole.

10. A laminated ring anti-friction bearing, comprising laminated race members, and a load carrying ring element embedded in and moving in raceways formed in the race members, said race members including alternate laminations and separators and the laminations being formed with projections extending thru the separators and engaging in recesses in adjacent laminations for forming a rigid whole of the laminated unit, one of the laminations of each race member being formed into a master lamination arranged for being engaged in the unit last and then locking the unit into the said rigid whole, a means being provided for holding the laminations and separators in assembled condition.

11. A laminated ring anti-friction bearing, comprising laminated race members, and a load carrying ring element embedded in and moving in raceways formed in the race members, said race members including alternate laminations and separators and the laminations being formed with projections extending thru the separators and engaging in recesses in adjacent laminations for forming a rigid whole of the laminated unit one of the laminations of each race member being formed into a master lamination arranged for being engaged in the unit last and then locking the unit into the said rigid whole, a means being provided for holding the laminations and separators in assembled condition consisting of end rings threadedly engaged on the laminations.

12. A laminated ring anti-friction bearing comprising laminated race members and a load carrying ring element embedded in and moving in raceways formed in the race members, said race members including alternate laminations and separators and the laminations being formed with projections extending thru the separators and engaging in recesses in adjacent laminations for forming a rigid whole of the laminated unit, one of the laminations of each race member being formed into a master lamination arranged for being engaged in the unit last and then locking the unit into the said rigid whole, also one of the laminations being formed with a key groove for receiving a key to hold the race member on a shaft.

13. A laminated ring anti-friction bearing, comprising laminated race members, and a load carrying ring element embedded in and moving in raceways formed in the race members, said race members comprising holding casings, and laminations and separators therein.

14. A laminated ring anti-friction bearing, comprising laminated race members, and a load carrying ring element embedded in and moving in raceways formed in the race members said race members comprising molding casings with hub portions, and laminations and separators within the casings held relative to the casings by projections from the casings engaging against portions of the laminations.

15. A laminated ring anti-friction bearing, comprising laminated race members, and a load carrying ring element embedded in and moving in raceways formed in the race members, said race members comprising holding casings with hub portions, and laminations and separators within the casings held relative to the casings by projections from the casings engaging against portions of the laminations and oil passages formed within the casings and laminations for directing oil to lubricate and cool the bearing.

16. A laminated ring anti-friction bearing, comprising laminated race members, and a load carrying ring element embedded in and moving in raceways formed in the race members, said race members comprising holding casings with hub portions, and laminations and separators within the casings held relative to the casings by projections from the casings engaging against portions of the laminations one lamination in each casing being a master lamination for holding the other laminations in a locked condition.

Signed at New York city, in the county of New York and State of New York, this 7th day of December, A. D. 1928.

FRITZ E. BRESIEN.